(12) United States Patent
Schoenmaker et al.

(10) Patent No.: US 6,190,709 B1
(45) Date of Patent: Feb. 20, 2001

(54) FLAVOR ENHANCER

(75) Inventors: Arie Cornelis Schoenmaker, Zaandam; Johanna Plijter-Schuddemat, Wateringen; Luppo Edens, Rotterdam, all of (NL)

(73) Assignee: Gist-Brocades B.V., Wateringseweg (NL)

( * ) Notice: Under 35 U.S.C. 154(b), the term of this patent shall be extended for 0 days.

(21) Appl. No.: 09/378,086

(22) Filed: Aug. 20, 1999

Related U.S. Application Data

(63) Continuation of application No. 08/997,120, filed on Dec. 23, 1997, now Pat. No. 6,007,851, which is a continuation-in-part of application No. 08/801,343, filed on Feb. 19, 1997, now abandoned, and a continuation-in-part of application No. 08/832,192, filed on Apr. 8, 1997, now abandoned, and a continuation-in-part of application No. 08/858,579, filed on May 19, 1997, now abandoned.

(30) Foreign Application Priority Data

Dec. 23, 1996 (EP) .................................................. 96203622
Apr. 8, 1997 (EP) .................................................. 97201003
May 16, 1997 (EP) .................................................. 97201490

(51) Int. Cl.[7] ...................................................... A23L 1/20
(52) U.S. Cl. .............................. 426/46; 426/44; 426/533; 426/634; 426/650
(58) Field of Search ............................... 426/46, 44, 49, 426/52, 53, 533, 534, 615, 629, 634, 650

(56) References Cited

U.S. PATENT DOCUMENTS 5,077,062 * 12/1991 Ernster .................................... 426/46
5,141,757   8/1992  Ho Dac et al. .
5,180,597   1/1993  Hamm .

FOREIGN PATENT DOCUMENTS 0 199 981 A2  12/1986  (EP) .
0 325 986 A2   8/1989  (EP) .
0 408 063 A1   1/1991  (EP) .
2 216 386    11/1989  (GB) .
86/03943      7/1986  (WO) .
94/25580  * 11/1994  (WO) .

OTHER PUBLICATIONS

Baek et al, AN 97(02):J0182 FSTA, abstracting 1996 IFT annual meeting: book of abstracts, p. 120, ISSN 1082–1236.*

Ajinomoto, Database WPI, Derwent Publications, Ltd., Week 9551, Abstract AN–95–399318 (JP–07–274–944A).

Baek et al., "Evaluation of the Enzymatic Hydrolysis of defatted soybean meal by response surface methodology," (abstract), Institute of Food Technologies, 1996 IFT Annual Meeting, p. 120.

Pommer, *Cereal Foods World*, 40 (10), 745–748 (1995).

Zamek, Database WPI, Derwent Publications, Ltd., Week 9249, Abstract AN–92–399801 (DE 41 16 744 A).

* cited by examiner

*Primary Examiner*—Leslie Wong
(74) *Attorney, Agent, or Firm*—McDonnell Boehnen Hulbert & Berghoff

(57) ABSTRACT

A flavor enhancer which is low in monosodium glutamate, which is substantially free of 5'-IMP and 5'-GMP and which enhances both meat, vegetable and diary flavors. The use of the flavor enhancer in flavoring compositions and food and feed applications.

4 Claims, No Drawings

FLAVOR ENHANCER

CROSS REFERENCE TO RELATED APPLICATIONS

This application is a continuation of U.S. patent application Ser. No. 08/997,120 filed Dec. 23, 1997, now U.S. Pat. No. 6,007,851, which itself is a continuation-in-part of U.S. patent application Ser. No. 08/801,343 filed Feb. 19, 1997, now abandoned, a continuation-in-part of U.S. patent application Ser. No. 08/832,192 filed Apr. 8, 1997, now abandoned, and a continuation-in-part of U.S. patent application Ser. No. 08/858,579 filed May 19, 1997, now abandoned. Additionally, the application claims the priority of European Patent Application No. 96203622.4 filed in the Netherlands on Dec. 23, 1996, European Patent Application No. 97201003.7 filed in the Netherlands on Apr. 8, 1997, and European Patent Application No. 97201490.6 filed in the Netherlands on May 16, 1997.

TECHNICAL FIELD OF THE INVENTION

The present invention relates to a flavour enhancer, methods for preparing the flavour enhancer, to food and feed compositions comprising the flavour enhancer and to the use of the flavour enhancer.

BACKGROUND OF THE INVENTION

Flavour enhancers enhance the existing flavour of a food product. Two classes of well-known flavour enhancing compounds are monosodium glutamate and 5'-ribonucleotides. These flavour enhancing compounds are used as such, but are also, separately or in combination, part of flavour enhancing compositions.

Yeast extracts, for instance, which are prepared by enzymatic degradation of yeast, contain the flavour enhancing 5'-ribonucleotides guanosine-5'-monophosphate (5'-GMP) and inosine-5'-monophosphate (5'-IMP).

Hydrolysed vegetable proteins (HVPs), which are prepared by acid or enzymatic hydrolysis of vegetable protein, typically contain monosodium glutamate as their flavour enhancing compound. This monosodium glutamate is derived from the amino acids glutamic acid and glutamine released from the protein during hydrolysis.

Flavour enhancers which do not contain substantial amounts of at least either of the two classes of flavour enhancing compounds are very scarce. As far as the inventors know, the only disclosure of a flavour enhancer of this type is in U.S. Pat. No. 5,077,062.

U.S. Pat. No. 5,077,062 describes a soy hydrolysate which is prepared by hydrolysing at pH 6.6–7.2, 30–38° C. for about two hours. The resulting hydrolysate contains no free amino acids, is low in glutamate, and can be used as a flavour enhancer. However, the described flavour enhancer enhances fish flavours only.

BRIEF SUMMARY OF THE INVENTION

The present invention provides a flavour enhancer that is low in monosodium glutamate, methods for preparing the flavour enhancer, compositions comprising the flavour enhancer, and uses of the flavour enhancer. A preferred method for preparing the flavour enhancer as a soy protein hydrolysate comprises: (i) forming an aqueous suspension of a soy protein containing starting material (e.g. soy flour, soy protein isolate, soy beans, or soy bean flakes, meal or grits, which preferably are defatted); (ii) heating the aqueous suspension for at least from about 1 minute to about 15 minutes at a temperature of from about 60° C. to about 82° C.; (iii) incubating the suspension with a protease mixture comprising endoprotease and exoprotease activity, to obtain an amino acid level in the suspension of from about 20% to about 55%; (iv) adjusting the pH and temperature of the suspension to inactivate the endoprotease and exoprotease; and (v) recovering the soy protein hydrolysate (e.g. by concentrating and/or drying, or other appropriate means).

The present invention thus provides a flavour enhancer which is low in monosodium glutamate, has no yeast-like after taste, and enhances both meat, vegetable and dairy flavours. This offers the advantage of a wide applicability. The flavour enhancer can be used as such or, in a flavouring composition, e.g. in combination with a flavouring agent.

Since the flavour enhancer according to the invention is low in monosodium glutamate, it can also be used by individuals who prefer to minimise their monosodium glutamate intake, e.g. due to a sensitivity to monosodium glutamate.

Although the present flavour enhancer is a soy hydrolysate with its own characteristic taste, the taste of a food product comprising the soy hydrolysate as flavour enhancer is not reminiscent of the soy used to prepare the flavour enhancer. These and other objects and advantages of the present invention, as well as additional inventive features, will be apparent from the description of the invention set forth herein.

DETAILED DESCRIPTION OF THE INVENTION

The present invention provides, among other things, a soy hydrolysate which is obtainable by:
(i) heating a suspension of defatted soy flour in water for at least about 10 min at from about 65° C. to about 82° C.;
(ii) incubating the suspension with a mixture of endo- and exo-proteases obtained from *Aspergillus* species at from about 40° C. to about 60° C. at a pH of about 4 to about 6 for a sufficient time to obtain an amino acid level of 20% to 55%;
(iii) lowering the pH to between about 3.5 and about 4.5 and increasing the temperature to from about 80° C. to about 100° C. for a period of time ranging from about 10 minutes to about 4 hours; and
(iv) lowering the temperature to from about 25° C. to about 40° C. and, optionally, recovering the hydrolysate.

The starting material used for hydrolysis may contain from about 50% to about 100% (w/w) soy protein, preferably from about 50% to about 75%. In a preferred embodiment of the invention, defatted non-toasted soy flour (Cargill B. V., the Netherlands) containing about 52% (w/w) soy protein, maximally about 1.5% (w/w) fat, and from about 2 to about 4% (w/w) fibres is used. However, the person skilled in the art will understand that also other defatted soy protein containing material, such as soy protein isolate or toasted soy flour, may be used as starting material. Although soy beans may be used as well, the result can be less satisfactory, due to the oil present in these beans.

Advantageously the viscosity may be reduced, e.g. to facilitate further manipulation of the suspension; such reduction in viscosity preferably may be obtained by enzyme addition. Suitable enzyme preparations include Pescalase® (Gist-brocades, the Netherlands), B500® (Gist-brocades, the Netherlands) and Viscozyme® (NOVO Nordisk, Denmark), or enzyme preparations having similar activity. Preferably Pescalase® protease is used to reduce the viscosity. Although other enzymes, like cellulase e.g. present in Viscozyme®, are known to reduce viscosity, surprisingly we found that a short incubation with a protease, such as Pescalase® protease, sufficiently reduced the viscosity. For example, about 1 hour incubation at about 60° C. with about 0.5 w/w % Pescalase® protease sufficiently reduces viscosity of the suspension comprising soy flour.

Hydrolysis is desirably preceded by a heat step in order to inactivate disturbing native soy proteins, such as glycosidases, that may interfere with the reaction or quality of the end product. Heating the mixture for at least about 5 to 15 minutes, preferably at least about 7 minutes, at a temperature of from about 65° C. to about 82° C. substantially reduced the amount of off-flavours (or undesirable flavours) produced by the degradation of isoflavones. In a preferred embodiment, the mixture is heated for about 10 minutes at about 75° C. Notably while incubations at increased temperature according to the invention desirably is carried out for at least about 5 to about 15 minutes, incubation times longer than 15 minutes can be employed as long as this step does not product (other) undesirable flavours.

The soy protein optimally is enzymatically hydrolysed by mixtures of endoproteases and exoproteases. The ratio between the activities for the endo- and exo- proteases may vary from about 1 to 10, to about 10 to 1. To one skilled in the art it will be clear that this ratio (as one of the options) can be varied in order to provide for the desired amino acid level. Commercially available mixtures of endo- and exoprotease that can be used in the present invention are, for instance, Sumizyme® FP, Sumizyme® LP—proteases (both from Shin Nihon, Japan), Flavourzyme® protease (Novo Nordisk A/S, Denmark) and Protease M® Amano (Amano, Japan). Other comparable enzymes having similar properties can be used as well. These endo- and exo-protease mixtures preferably are obtained from an *Aspergillus* species, especially a species such as *A. oryzae* or *A. sojae*, although enzymes from other *Aspergillus* species, or indeed, other fungal species, similarly can be employed. Mixtures of these proteases, e.g., with other proteases such as for example Pescalase® protease which is a bacterial endoprotease, may also be used. Furthermore it may be advantageous to incubate several proteases either concurrently or sequentially. The proteases will preferably be incubated at optimum pH-conditions, or an average of the optimum pH conditions for the various proteases employed in conjunction. The pH is preferably controlled at a setpoint. During hydrolysis the pH setpoint may be changed, e.g. when another protease is added sequentially. Food grade alkalis such as e.g. NaOH or KOH and food grade acids, such as e.g. HCl, $H_2SO_4$ may be used to maintain the pH at a given set point. Enzyme concentrations may vary from about 0.2% to about 4% (w/w). Hydrolysis with mixtures of endo- and exo-proteases obtained from *Aspergillus* species are preferably carried out at a pH of from about 4 to about 6, more preferably at a pH of about 5.1, desirably at a temperature of from about 40° C. to about 60° C. Preferably, the temperature is from about 55° C. to about 60° C. Temperatures optimally should not exceed about 60° C., because of the risk of inactivating the enymes in the mixture. However, higher protease hydrolysis temperatures can be used if thermostabile or thermoresistant enzymes are employed.

According to one preferred embodiment, soy protein is incubated with a 2% (w/w) mixture of endo- and exoproteases obtained from *Aspergillus* species (e.g. Sumizyme® FP protease) at a pH of about 5.1 at about 55° C. for about 15 hours. The person skilled in the art will understand that to reach the same result in a shorter or longer period, the amount of enzyme will need to be adjusted. Hydrolysis for much longer than about 25 hours will increase the risk of contamination (undesirable bacterial growth) which may cause the production of undesirable compounds that affect the taste or food quality, and is therefore less preferable.

Optionally, in addition to exoproteases and endoproteases, other enzymes are added as well, such as for example glutaminases or cell wall degrading enzymes. Furthermore it is optional to add microorganisms in order to grow and ferment during hydrolysis. The microorganisms which may be added are preferably food grade. Also mixtures of such microorganisms can be used.

The microorganisms preferably are able to grow at a pH of from about 4 to about 6, and grow at temperatures of from about 40° C. to about 60° C., more preferably at temperatures of from about 50° C. to about 60° C. Incubation at temperatures from about 50° C. or higher reduces the risk of contamination with microorganisms that produce unwanted metabolites. Particularly preferred according to the invention is the use of bacteria such as *Bacillus*, e.g. a *Bacillus stearothermophilus* species or *Bacillus coagulans* species, including but not limited to a microorganism which has been classified by DSM(Z) (Deutsche Sammlung vom Mikroorganismen und Zellkulturen GmbH (Branunschweig; Germany)) as a *B. coagulans* (which was previously classified as a *B. stearothermophilus*) and is known under number CBS 772.97 (deposited at Centraal Bureau voor on May 13, 1997). *B. coagulans* CBS 772.97 is a bacterium capable of growth under (semi-) anaerobic conditions at temperatures of 55° C., and which during the fermentation of sugars produces lactic acid.

Addition of *B. coagulans* CBS 772.97 (or another microorganism) during proteolytic hydrolysis of the soy protein results in an anaerobic fermentation. During the anaerobic fermentation sugars are converted into acid, e.g., lactic acid. The free sugar content is therefore lowered during hydrolysis and this reduces formation of Maillard compounds (from free sugars and free amino acids). The final product therefore will contain less Maillard compounds and is therefore less colored and less spicy or less roasted flavored.

So according to another preferred embodiment of the invention, soy protein is incubated with a mixture of endo- and exo-proteases at from about 50 to about 60° C. for about 15 to about 25 hours in the presence of a fermenting, preferably food grade, microorganism, which is more preferably a *B. stearothermophilus* species or a *B. Coagulans* species, most preferably *B. coagulans* CBS 772.97. Incubation is carried out under conditions such that a desirable amino acid level is obtained as further described herein.

Due to the presence of a culture of a microorganism and the use of relatively high temperature, the risk of contamination is efficiently reduced. Therefore, longer incubation is possible when, in addition to the proteolytic enzyme mixtures of endo- and exo-proteases, a microorganism is added to the soy protein suspension.

After hydrolysis (optionally combined with fermentation) the pH of the hydrolysed suspension is lowered and the temperature is raised so as to inactivate the enzymes. This will also kill microorganisms which are present, such as *Bacillus stearothermophilus* (which belongs to the natural microbial flora of untoasted soy flour) or *Bacillus coagulans*. The pH is preferably adjusted to between about 3.5 and about 4.5, desirably to between about 3.8 and about 4.2. This pH adjustment will result in precipitation of a part of the proteins present in the hydrolysed suspension. The lower the pH, the more protein will precipitate. This precipitated protein will be seperated, e.g., by filtration or centrifugation, from the final soluble soy protein hydrolysate. Although this results in lower production yields for the final product, the final product can now be used in almost any desirable food or feed product, without producing protein precipitate in these food or feed products. E.g. in clear beverages or other products this may be advantageous. Optimally the temperature may be raised to from about 80° C. to about 100° C., for from about 10 minutes to about 4 hours, preferably for from about 10 to about 30 minutes. In a preferred embodiment of the invention, hydrolysis is terminated by incubating for about 15 minutes at a pH of about 4.0 and a temperature of about 80° C.

Before, during or after concentrating and/or drying the hydrolysate may be cooled. If the hydrolysate is subjected to centrifugation or filtration, the hydrolysate is preferably first cooled to from about 25° C. to about 40° C. before centrifugation or filtration.

The product can be concentrated and/or dried in any convenient way, such as spray-drying, freeze-drying, fluidised-bed treatment, or a combination of these methods. The person skilled in the art will understand that the method chosen will depend on the formulation of the product. The product may be formulated in any convenient way, e.g. as a paste, liquid, emulsion, powder, flakes, extrudate, granulate, or pellets. According to one preferred embodiment, the product is formulated as a spray-dried powder.

The amino acid level (AAL) of the product obtained is preferably from about 20% to about 55%. The 'amino acid level' is defined as 'free amino acids/total amount of amino acids', wherein 'total amount of amino acids'='free amino acids+amino acid freed after acid hydrolysis of remaining protein material'. The amino acid level is expressed in terms of percentages, whereas free amino acids and total amount of amino acids are both expressed in $\mu$mol/gram. In a preferred embodiment of the invention, the amino acid level is from about 25% to about 45%.

The product obtained may contain lactic acid, preferably in amounts of from about 1 to about 20 w/w %, more preferably in amounts of from about 2 to about 15 w/w %, most preferably in amounts of from about 3 to about 10 w/w %.

A typical soy protein hydrolysate according to the invention comprises:

| | |
|---|---|
| Carbohydrates about | 5% to about 10% |
| Protein about | 45% to about 55% |
| Lactate about | 1% to about 30% |
| Ash about | 10% to about 30% |

All percentages based on w/w dry matter. The protein fraction comprises an amino acid level of from about 20% to about 55%. The amount of monosodium glutamate on dry matter is below about 4%, preferably below about 3%, more preferably below about 2.5%. A typical soy protein hydrolysate according to the invention comprises about 1.5% to about 2.5% (w/w dry matter) monosodium glutamate.

The soy protein hydrolysate is substantially free of 5'-IMP and 5'-GMP, which means that less than about 0.1% (w/w dry matter) will be present in the soy protein hydrolysate. Preferably less than 0.01% (w/w dry matter) 5'-IMP and 5'-GMP will be present in the soy protein hydrolysate.

Since the flavour enhancer according to the invention is low in monosodium glutamate, it can also be used by individuals who prefer or need to minimise their monosodium glutamate intake. Since it is not a yeast extract, the flavour enhancer according to the invention has no yeast-like after taste.

Un like the flavour enhancer disclosed in U.S. Pat. No. 5,077,062, the flavour enhancer according to the invention enhances a broad range of flavours. Therefore, it can be used in meat applications, e.g., to enhance beef or poultry flavour; vegetable applications, e.g., to enhance paprika, carrot, mushroom, onion or garlic flavour; and dairy applications, e.g., to enhance cheese or butter flavour; bakery applications, e.g., to enhance the flavour of baked products; and to enhance the flavour of beverages. It can be added to food products whether fresh, frozen, vacuum preserved or dried; processed or unprocessed; liquid or solid; alcoholic or non-alcoholic; for human consumption or animal consumption. Food products to which it can be added include but are not limited to basic bouillons, such as beef stock, lobster stock, chicken stock, fish stock, vegetable stock, and the like; snacks, such as, e.g., cheese crackers, crisps, and the like; sauces and dressings, such as cheese sauce, brown gravy, curry sauce, garlic sauce, dip sauces, dressings for salads and/or vegetables, and the like; soups, such as onion soup, beef noodle soup, and the like; mayonnaise, halvanaise, margarine, butter and the like; baked goods like croissants, bread , cake and crackers; ready to eat meals; seasonings, such as paprika seasoning, and the like; custard and whipped cream; chocolate flavoured products, like cocoa flavoured beverages, e.g., chocolate flavoured soy milk, or chocolate bars (to enhance the cocoa-flavour of these products). According to one preferred embodiment, the flavour enhancer is added to mushroom soup to enhance mushroom flavour.

Although the flavour enhancer according to the invention enhances the richness of the taste of meat-based foodstuffs, the flavour enhancer is particularly suitable for enhancing dairy-type flavour notes (like cheese), vegetable-type notes (e.g. carrot, tomato, mushroom, onion) and spices (e.g. pepper (pepper heat note enhancement), garlic).

A particularly new effect of the flavour enhancer according to the invention is the prolonged flavour perception. Addition of the flavour enhancer according to the invention to a food product makes the food product's taste last longer in the mouth (this is called the linger longer® taste effect). Furthermore creamy-tasting products taste more creamy and will obtain a thicker mouthfeel when the flavour enhancer according to the invention is added to the food product. The use of the soy protein hydrolysate will enhance the creaminess and mouthfeel of the food or feed product, essentially without increasing the viscosity of these food or feed compositions.

The flavour enhancer of the invention may be used as such or in flavouring composition, e.g. in combination with flavouring agents. In this context, the term 'flavouring agent' is used to indicate a compound or a mixture of compounds which is used to create a flavour which is not present in a product. The flavour enhancer may further be used as a compound in the production of processed flavours. Due to the high amount of free amino acids it may be used as a source of amino acids in the production of processed or reaction flavours.

The invention is further illustrated by the following examples. Of course, the following examples are illustrative only and should not be construed as in any way limiting the scope of the invention.

EXAMPLES

Methods

Amino acid analysis was carried out according to the Picotag method of Waters (Milford Mass., USA). The Picotag method comprises a prederivatization step using phenylisothiocyanate. HPLC analysis is performed on a Picotag column using reversed phase chromatography. Total hydrolysis of protein was achieved by dry hydrolysis over 6 N HCl, also according to Waters. Amino acids hydrolysed by enzymatic activity ere determined in the supernatant. After hydrolysis, the various samples were immediately centrifuged in an Eppendorf table top centrifuge 5417 at 14000 rpm for 5 minutes after which the total supernatant was removed and kept frozen at −20° C. Amino Acid analysis took place immediately after thawing the sample material.

Carbohydrates were determined according to Anthrone, J. H. Roe (1955) J.Biol.Chem. 212, 335–343.

Protein contents were determined according to Kjeldahl, Approved methods of the American Association of Cereal Chemists, Volume II, 1983 American Association of Cereal Chemists, Inc., Methods 46-09.

EXAMPLE 1

Preparation of the Hydrolysate 450 g of defatted soy flour 200/80 (52% w/w protein, Cargill B. V., the Netherlands) was suspended in 2.5 l water at 20° C. in the presence of 0.5% (w/w) Pescalase® protease (Gist-Brocades, the Netherlands). This suspension was heated for 10 minutes at 75° C. After cooling to 55° C. and adjusting to pH 5.1, the suspension was hydrolysed for 15 hours using 2% (w/w) Sumizyme® FP protease (Shin Nihon, Japan). After hydrolysis, this mixture was incubated at pH 4.0 and 80° C. for 15 minutes to stop hydrolysis. After cooling to 40° C. the hydrolysate was obtained by centrifugation for 30 minutes at 2200 g. The pellet was washed twice with process water. The resulting slurry was filtered at a pressure of 0.4 to 1 bar using Dicalite 418 as a filter aid. After concentration by rotary evaporation at 40° C., 50 mbar, the filtrate was spray-dried (inlet temperature 130° C., outlet temperature 80° C.). A light coloured powder was obtained.

The taste of the obtained powder was evaluated by a trained Expert Taste Panel of ten individuals.
1% of the powder was solved in water of 60° C. The experts evaluated both smell and taste of the 1% solution.
Remarks of the Expert Taste Panel:
  smell: malty, sickly, floury, soy
  taste: slightly bitter, slightly a-stringent, sickly, soy, no umami.

EXAMPLE 2

Vegetable Soup

To 100 g of liquid mushroom soup 0.1–1% (w/w) of the powder obtained in example 1 was added. An expert taste panel found the soup to have an increased mushroom character, an increased richness in flavour, more mushroom after taste and generally more mouthfeel.

EXAMPLE 3

Meat Stock

To 100 g of beef stock up to 0.3% (w/w) of the powder obtained in example 1 was added. An expert taste panel found the resulting stock to have increased beef flavour, more beef after taste and an increased richness in flavour.

EXAMPLE 4

Mayonnaise

To 100 g of mayonnaise 0.3% (w/w) of the powder obtained in example 1 was added. An expert taste panel found the resulting mayonnaise to have increased richness in flavour, more freshness and creaminess.

EXAMPLE 5

Paprika seasoning

A paprika seasoning was prepared by mixing

| 19  | g | salt                                      |
|-----|---|-------------------------------------------|
| 10  | g | tomato powder                             |
| 19  | g | paprika powder                            |
| 15  | g | dextrose                                  |
| 15  | g | flour                                     |
| 7   | g | monosodium glutamate                      |
| 0.6 | g | Maxarome ® yeast extract (Gist-Brocades)  |
| 11  | g | powder obtained in example 1              |

All ingredients were blended until a homogeneous dust-on flavour was obtained. To 100 g snacks (unsalted natural crisps) 10 g of this dust-on flavour was added. An expert taste panel found the resulting snack to have an enhanced paprika flavour.
A reference seasoning mix which contained yeast extract instead of the powder obtained in example 1 was found by the taste panel to have a more beefy character and a salty impact.

EXAMPLE 6

Curry Sauce 0.5% (w/w) powder obtained in example 1 was added to 100 g of a curry sauce. An expert taste panel found the resulting curry sauce to have a more rounded character, enhanced spicy notes, particularly, the curry, ginger, pepper and chili notes.

EXAMPLE 7

Cheese Crackers 8.0 g of the powder obtained in example 1 was added to the following ingredients:

| 66.0  | g | cheese powder    |
|-------|---|------------------|
| 2.5   | g | salt             |
| 10.0  | g | sugar            |
| 0.5   | g | maltodextrin     |
| 7.0   | g | malt flour       |
| 8.5   | g | whey powder      |
| 14.0  | g | ammonium         |
| 1.4   | g | bicarbonate      |
| 0.5   | g | bisulphate       |
| 113.0 | g | water            |
| 69.0  | g | hydrogenated Oil |
| 381.8 | g | flour            |

All ingredients were mixed for 140 seconds in a Hobart mixer using a dough hook; kneaded for 80 seconds and rolled out to 1 mm thick sheets. The sheet was transferred to a baking plate, cut in 5×5 cm squares and docked. The dough was baked for about 6 minutes in an oven at about 270–280° C. An expert taste panel found the cheese crackers prepared with the powder obtained in example 1 to have more cheesy taste. The cheese tasted more mature and obtained a more melted cheese type character as well according to the taste panel.

EXAMPLE 8

Preparation of the Hydrolysate, using *B. coagulans* CBS 772.97

351 g of defatted soy flour 200/80 (52% w/w protein, Cargill B. V., the Netherlands) was suspended in 1.5 l water at 60° C. in the presence of 0.5% Pescalase® protease (Gist-brocades, the Netherlands). The enzyme was dosed as percentage of the dry mater of the suspension. The temperature of the suspension was raised to 75° C. in 3.5 hours. During cooling of the suspension to 55° C., the pH was raised to 8.0 using KOH. After adding 0.75% (weight/dry weight) Pescalase® protease, these conditions were maintained for 2 hours. Then the pH was adjusted to 5.1 using $H_2SO_4$, and an inoculum of *B. coagulans* CBS 772.97 and 1% (weight/dry weight) Sumizyme® FP protease (Shin Nihon, Japan) were added to the mixture. The inoculum of *B. coagulans* CBS 772.97 was made by culturing a frozen culture of *B. coagulans* CBS 772.97 on a medium of glucose and Gistex yeast extract (Gist-brocades) pH=5 for 16 hours at 55° C. To the suspension about $5.10^3$ cells per ml (final concentration of cells in the suspension, after addition of the cells to the suspension) were dosed. The mixture was fermented and hydrolysed at constant pH and temperature for 15 hours. The reaction was terminated by adding $H_2SO_4$ to a pH of 4.0 was reached and raising the temperature to 82° C. in 2 hours. After cooling the suspension to 40° C., the non-solubilized material was removed by centrifugation for 30 min at 2200 g. The pellet was washed twice with water.

After a heatshock for 5 min at 95° C., the supernatant was concentrated in a glass evaporator at 60° C. and 120–150 mbar. Afterwards, the pH of the concentrate was adjusted to 5.1 and the material was spray dried.

Analysis of the obtained spray dried powder resulted in the following:

| Protein (Kjeldahl) | 48% |
| --- | --- |
| Carbohydrates (Anthrone) | 7.5% |
| Lactate | 4% |
| Ash | 24% |

The amino acid level was 43% and the powder contained 2.3% monosodium glutamate.

EXAMPLE 9

Mushroom Soup Prepared With the Product of Example 8 to 100 g of liquid mushroom soup 0.1–1% (w/w) of the powder obtained in example 8 was added. An expert taste panel found the soup to have an increased mushroom character, an increased richness in flavour, more mushroom after taste and generally more mouthfeel.

EXAMPLE 10

Cheese Sauce 1.32 g of the powder obtained in Example 1 was added to the following ingredients:

| 500 | g | Water (100 g cold, 400 g. boiling) |
| --- | --- | --- |
| 20.00 | g | Starch |
| 17.67 | g | Maltodextrine |
| 15.00 | g | Cheddar cheese powder |
| 10.00 | g | Gouda cheese powder |
| 10.00 | g | Wheat flour |
| 10.00 | g | Milk powder |
| 5.00 | g | Cream powder |
| 5.00 | g | Fat powder |
| 4.50 | g | Salt |
| 1.00 | g | Lactose |
| 0.50 | g | Milkprotein (EM6) |
| 0.05 | g | Citric acid |
| 0.02 | g | Caramel powder |
| 0.06 | g | Turmeric (liquid) |
| 0.15 | g | White pepper |
| 0.40 | g | Onion powder |
| 0.05 | g | Mace |
| 0.05 | g | Nutmeg |
| 0.05 | g | Laurel |
| 0.50 | g | Guar |

All ingredients (except water) were mixed until homogeneous. Then water was added while stirring.

An Expert Taste Panel found the sauce to have an increased age perception of the cheese, an increased salt and spice perception, more creaminess, fuller mouthfeel and an extended flavour release (linger longer).

EXAMPLE 11

Medium Fat Margarine

To 100 g of medium fat margarine 0.30% (w/w) of the powder obtained in Example 1 was added. An Expert Taste Panel found the resulting medium fat margarine to have an increased flavour impact, an increased creaminess, improved fatty butter taste and an extended flavour release (linger longer®).

EXAMPLE 12

Preparation of the Hydrolysate, Using B 500 and Flavourzyme® Proteases 351 g of defatted soy flour, Nutrisoy® 7 B flour (53% w/w protein, ADM, The Netherlands) was suspended in 1.5 l water at 60° C. in the presence of 0.5% B 500® protease (Gist-brocades, the Netherlands). The enzyme was dosed as percentage of the dry matter of the suspension. The temperature of the suspension was raised to 75° C. in 3.5 hours. During cooling of the suspension to 55° C., the pH was raised to 8.0 using KOH. After adding 0.75% (weight/dry weight) B 500® protease, these conditions were maintained for 2 hours. Then the pH was adjusted to 5.1 using $H_2SO_4$, and an inoculum of *B. coagulans* CBS 772.97 and 1% (weight/dry weight) Flavourzyme® protease (Novo Nordisk A/S, Denmark) were added to the mixture. The inoculum of *B. coagulans* CBS 772.97 was made by culturing a frozen culture of *B. coagulans* CBS 772.97 on a medium of glucose and Gistex® yeast extract (Gist-brocades) pH=5 for 16 hours at 55° C. To the suspension about $5.10^3$ cells per ml (final concentration of cells in the suspension, after addition of the cells to the suspension) were dosed. The mixture was fermented and hydrolysed at constant pH and temperature for 15 hours. The reaction was terminated by adding $H_2SO_4$ to a pH of 4.0 was reached and raising the temperature to 82° C. in 2 hours. After cooling the suspension to 40° C., the non-solubilized material was removed by centrifugation for 30 min at 2200 g. The pellet was washed twice with water.

After a heatshock for 5 min at 95° C., the supernatant was concentrated in a glass evaporator at 60° C. and 120–150 mbar. Afterwards, the pH of the concentrate was adjusted to 5.1 and the material was spray dried.

EXAMPLE 13

Mushroom Soup Prepared With the Product of Example 12

To 100 g of liquid mushroom soup 0.1–1% (w/w) of the powder obtained in example 12 was added. An expert taste panel found the soup to have an increased mushroom character, an increased richness in flavour, more mushroom after taste and generally more mouthfeel.

EXAMPLE 14

Croissants

Recipe for the production of 120 small croissants:

| | | |
|---|---|---|
| 2000 | g | flour |
| 1100 | g | water |
| 100 | g | yeast |
| 40 | g | salt |
| 60 | g | commercial bread improver |
| 800 | g | fat |
| 10 | g | soy protein hydrolysate obtained in Example 1 |

The dough was kneaded at 25° C.
moulding
resting time: 15 min. at −20° C.
moulding
resting time 5 min. at −20° C.
proof time 65 min. at 35° C.
steaming 2 min. at 85° C.
baking: 15 min. at 230–250° C.
The croissant had a more cheese-like smell. The taste was more fresh and roasted compared to the control croissants.

EXAMPLE 15

Cream Crackers

Recipe

| | | |
|---|---|---|
| 984 | g | flour |
| 330 | g | water |
| 150 | g | soft type bakery fat |
| 6 | g | salt |
| 30 | g | dextrose |
| 0.070 | g | cystein |
| 7.5 | g | Soy protein hydrolysate obtained in Example 1 |

The dough was kneaded, moulded and baked for 6 min. at 270/280° C. The smell of these crackers changed from staled to more fresh, due to the addition of the soy protein hydrolysate, the taste changed from musty, floury to new, roasted, nutty and cheese-like.

All references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments can be used and that it is intended that the invention can be practiced otherwise than as specifically described herein. Accordingly, this invention includes all modifications encompassed within the spirit and scope of the invention as defined by the following claims.

What is claimed is:

1. A soy protein hydrolysate flavor enhancer which is substantially free of 5'-IMP and 5'-GMP and comprises less than 4% (w/w dry matter) of monosodium glutamate, an amino acid level of from about 20% to about 55% (w/w dry matter), carbohydrate in an amount of from about 5% to about 10% (w/w dry matter), protein in an amount of from about 45% to about 55% (w/w dry matter), and ash in an amount of from about 10% to about 30% (w/w dry matter).

2. The soy protein hydrolysate of claim 1, wherein said hydrolysate comprises lactate in an amount of from about 1% to about 20% (w/w dry matter).

3. A food or feed product comprising a food or feed and an effective flavour enhancing amount of the composition of claim 1.

4. A food or feed product of claim 3 where in the food is selected from the group consisting of a soup, sauce, dressing, bakery product, dairy product, chocolate flavored food product, meat product and beverage.

* * * * *